US005976218A

United States Patent [19]

Virnig et al.

[11] Patent Number: 5,976,218

[45] Date of Patent: Nov. 2, 1999

[54] PROCESS FOR THE RECOVERY OF NICKEL

[75] Inventors: Michael J. Virnig, Tucson, Ariz.; J. Murdoch MacKenzie, Gisborne, Australia

[73] Assignee: Henkel Corporation, Gulph Mills, Pa.

[21] Appl. No.: 08/845,941

[22] Filed: Apr. 29, 1997

Related U.S. Application Data

[60] Provisional application No. 60/017,527, May 10, 1996.

[51] Int. Cl.[6] .................................................... C21B 15/00

[52] U.S. Cl. ................................................ 75/738; 75/743

[58] Field of Search ............................. 75/710, 711, 743, 75/738; 423/139

[56] References Cited

U.S. PATENT DOCUMENTS

| | | | |
|---|---|---|---|
| 3,428,449 | 2/1969 | Swanson | 75/117 |
| 3,907,966 | 9/1975 | Skarbo | 423/139 |
| 3,952,775 | 4/1976 | Ogata | 137/625.38 |
| 4,006,216 | 2/1977 | Ettel et al. | 423/139 |
| 4,020,105 | 4/1977 | Ackerley et al. | 260/566 |
| 4,020,106 | 4/1977 | Ackerley et al. | 260/566 |
| 4,029,704 | 6/1977 | Anderson | 260/566 |
| 4,083,915 | 4/1978 | Hubred et al. | 423/49 |
| 4,085,146 | 4/1978 | Beswick | 260/600 |
| 4,105,743 | 8/1978 | Reinhardt et al. | 423/24 |
| 4,160,807 | 7/1979 | Virnig et al. | 423/24 |
| 4,234,546 | 11/1980 | van der Zeeuw et al. | 423/139 |
| 4,507,268 | 3/1985 | Kordosky et al. | 423/24 |
| 4,544,532 | 10/1985 | Kordosky et al. | 423/24 |
| 4,582,689 | 4/1986 | Kordosky | 423/24 |
| 4,975,253 | 12/1990 | Monzyk et al. | 423/139 |
| 5,470,552 | 11/1995 | Kordosky et al. | 423/139 |
| 5,571,308 | 11/1996 | Duyvesteyen et al. | 75/430 |

FOREIGN PATENT DOCUMENTS

| | | |
|---|---|---|
| 1322532 | 7/1973 | United Kingdom . |
| WO9641029 | 12/1996 | WIPO . |

OTHER PUBLICATIONS

Minerals Sci. Engineering, vol. 5, No. 1, Jan. 1973, pp. 36–52.

International Laterite Symposium, "Heterogenous Equilibria in Ammonia/Laterite Leaching Systems", Osseo–Asre et al., SME New York, Dec. 1979, pp. 585–609.

Mining Engineering, "Use of pH Control in Solvent Extraction Circuits", SME New York, Mar., 1981, pp. 291–299.

AIME Annual Meeting, "Recovery of Nickel by Liquid Ion Exchange Technology", Merigold et al, Feb. 25–Mar. 2, 1973.

USBM R1 8605, Solvent Extraction of Nickel and Copper From Laterite–Ammoniacal Leach Liquors, Nilsen et al, Dec. 1982.

ISEC, "Nickel Cobalt Separation by Ammoniacal Solvent Extraction: The Operating Experience", Skepper et al., University of Melbourne, pp. 777–782 (No Date).

Hydrometallurgy, "The SEC Nickel Process", Eliason et al, Oct., 1973, pp. 82–86.

*Primary Examiner*—Scott Kastler

*Attorney, Agent, or Firm*—Ernest G. Szoke; Wayne C. Jaeschke; Patrick J. Span

[57] ABSTRACT

A process for the recovery of nickel from a nickel containing ore in which the ore, particularly a laterite ore, is initially leached with an aqueous acid solution, after which the nickel is precipitated as nickel hydroxide by adding a hydroxide to the aqueous acid leach solution containing the nickel, followed by a re-leaching of the nickel with an aqueous ammoniacal solution and recovery of the nickel by a solvent extraction of the nickel from the aqueous ammoniacal solution with an organic phase of a water insoluble oxime extractant dissolved in a water-immiscible hydrocarbon solvent and the nickel recovered by electrowinning the nickel from the aqueous acid stripping solution employed to strip the nickel from the organic phase.

19 Claims, 3 Drawing Sheets

PROCESS FOR THE RECOVERY OF NICKEL

CROSS-REFERENCE TO RELATED APPLICATIONS

This application claims priority from U.S. provisional application Ser. No. 60/017,527 filed May 10, 1996, the disclosure of which is incorporated herein by reference.

BACKGROUND OF THE INVENTION

1. Field of the Invention

This invention relates to an improved process for the recovery of nickel from aqueous acidic solutions containing nickel values, resulting from commercial processes, and containing other metals, and employing as the last step or stage in the process an extraction step from aqueous ammoniacal solutions, with an oxime extractant, such as a ketoxime.

2. Statement of Related Art

Nickel remains one of the commercially important metals for which there is no simple solvent extraction based route for recovery from acid leach sulfate solutions. Although solvent extraction of nickel from acid sulfate solutions is possible using carboxylic acids (VERSATIC™ acids), and alkyl derivatives of phosphoric and phosphinic acids e.g. D2EHPA (di-2-ethylhexyl phosphoric acid), these extractants do not offer high selectivity over other metals such as manganese, iron, cobalt, magnesium and calcium. In order to achieve selective extraction of nickel, these reagents require careful pH control and multiple crowding (scrubbing) stages. In addition the VERSATIC acids are most effective for nickel extraction in the pH range of 6–8, which is above the pKa of the carboxylic functionality of approximately 5.2. This means that the VERSATIC acid will form alkali metal soaps and this leads to solubility problems with this reagent.

The liquid-liquid extraction of nickel from acid sulfate solutions was reviewed in 1973 by Warshawsky in "The Liquid-Liquid Extraction of Nickel: A Review, Minerals Sci. Engineering, Vol. 5, No. 1, January 1973, pp.36–52, and only limited progress has been made since this review. Warshawsky observed that the development of reagents which showed selectivity of nickel over other transition elements was not expected to be easy and such has been proven to be the case. The development of a suitable nickel extractant has been complicated by the fact that the nickel electrowinning is very sensitive to pH, with only a small pH window of 3.8–4.2 suitable to electrowinning, which is significantly higher than the typical pH of acid sulfate leach liquors.

Recently, interest in the recovery of nickel from laterite ores and sulfide concentrates using hydrometallurgical routes has led to a reexamination of the recovery of nickel from such ores or concentrates, which initially involve leaching with sulfuric acid to provide an acidic sulfate aqueous solution containing the nickel, along with the other metals associated therewith.

"Heterogenous Equilibria in Ammonia/ Laterite Leaching Systems" are discussed in International Laterite Symposium, by Osseo-Asre, K. and Aelhere, S. W., Ed. Evans, D. J. I., Shoemaker, R. S. and Veltman, H., SME New York, 1979, pp. 585–609.

A Cobalt Stripping process is described in U.S. Pat. No. 4,083,915 issued to Hubred, G. L. in 1975.

G. A. Kordosky et al describe "Use of pH Control in Solvent Extraction Circuits", Mining Engineering, SME New York, March 1981. pp.291–299.

"Recovery of Nickel by Liquid Ion Exchange Technology", is discussed by C. R. Merigold and R. B. Sudderth, AIME Annual Meeting, Chicago, Feb. 25–Mar. 2, 1973.

Also D. N. Nilsert et al discuss "Solvent Extraction of Nickel and Copper From Laterite-Ammoniacal leach Liquors", USBM R1 8805, 1982.

Further, I. G. Sloepper and J. E. Fittock discuss "Nickel Cobalt Separation by Ammoniacal Solvent Extraction: The Operating Experience", Proceedings of ISEC, 1996, University of Melbourne, pp.777–782.

Other items relating to extraction of Nickel are:

(1) U.S. Pat. No. 3,907,966 for Nickel Extraction and Stripping Using Oximes and Ammoniacal Carbonate Solutions issued Sep. 23, 1975 to Ronald R Skarbo.

(2) "The S.E.C. Nickel Process" by Richard D. Eliason and Edward Edmunds Jr., Hydrometallurgy, October, 1973, pp. 82–86.

(3) Commonly assigned, U.S. Pat. No. 5,470,552 for NICKEL EXTRACTION PROCESS of Kordosky et al, which discusses many other references in the related art section thereof, the disclosure of which is hereby incorporated by reference.

DESCRIPTION OF THE INVENTION

Figure 1:
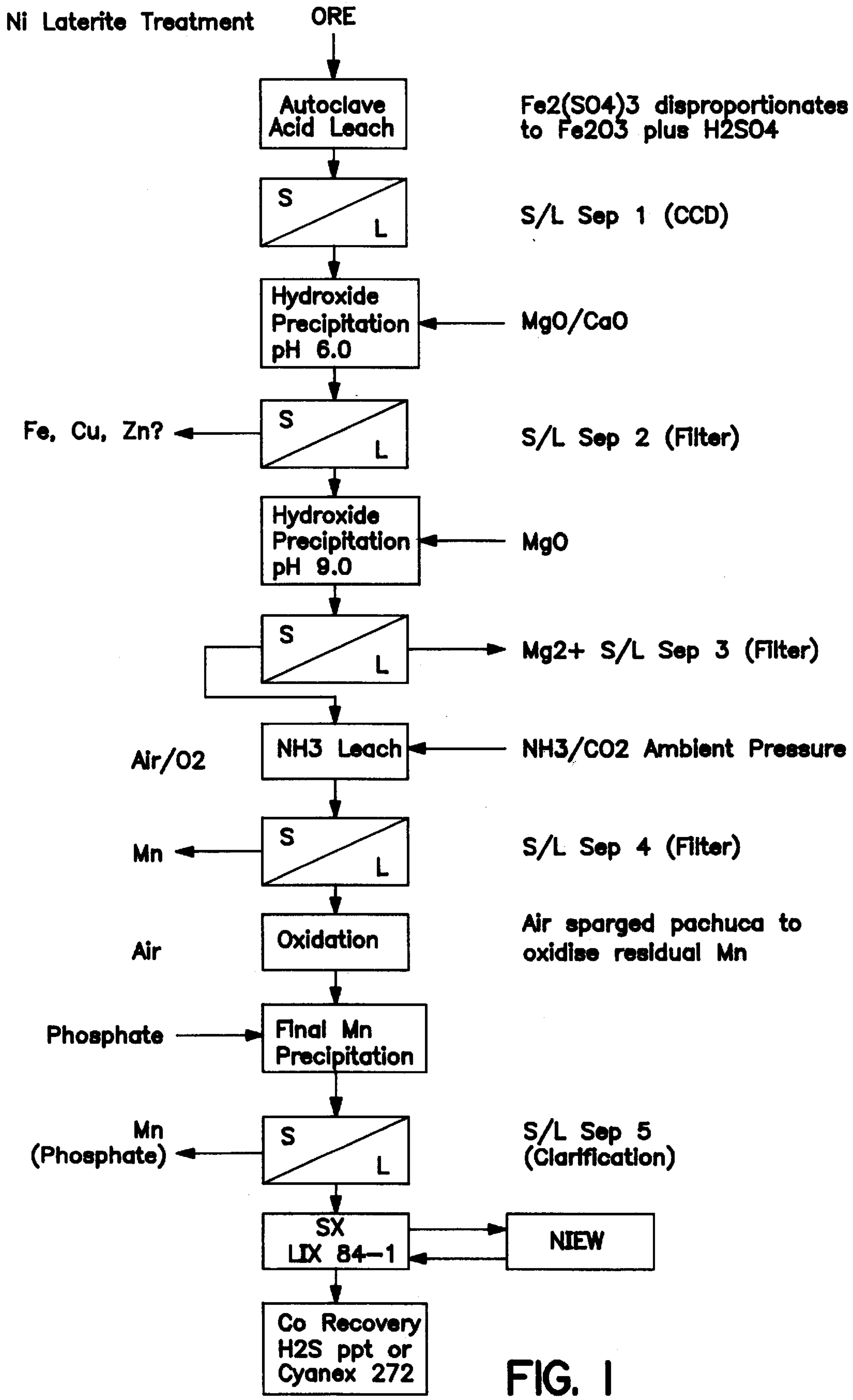
FIG. 1 is a diagrammatic representation of the general process of the present invention of a treatment of a laterite ore, initially with an acid leach, followed by removal of various other metals, and concluding with an extraction of an aqueous ammoniacal leach solution to remove the nickel, employing an oxime extractant, after which the nickel containing strip solution is processed by electrowinning to remove the nickel, while the raffinate containing Co is processed to remove Co by precipitation with $H_2S$.

In this description, except in the operating examples or where explicitly otherwise indicated, all numbers describing amounts of ingredients or reaction conditions are to be understood as modified by the word "about".

Briefly, the present invention has been found to be a technically and economically viable process for the recovery of nickel, particularly from laterite ores which contain a variety of other metals, which on acid leaching are leached from the ore nonselectively. This provides an acid leach liquor, which must be processed so as to remove the other metals which may cause problems in the recovery of the nickel by solvent extraction.

In its broadest terms, it has been discovered that when an ore such as laterite is leached with an acid, such as sulfuric acid, followed by precipitation of nickel hydroxide and releaching of the nickel in ammonia, the nickel can then be recovered by solvent extraction of the nickel using water insoluble oxime extractants dissolved in a water immiscible hydrocarbon solvent. Such a circuit overcomes many of the problems associated with direct solvent extraction of nickel from acid leach solutions using commercially proven solvent extraction processes. Accordingly in its broadest terms, the present invention is a process for the recovery of nickel from a nickel containing ore comprising:

(1) acid leaching of the ore to provide an acid leach liquor containing nickel along with other metal values;

(2) precipitating the nickel with a hydroxide to provide nickel hydroxide;

(3) releaching the nickel hydroxide with an aqueous ammoniacal leach solution providing an ammoniacal leach solution containing the nickel values;

(4) contacting the ammoniacal leach solution with a water insoluble oxime extractant dissolved in a water immiscible hydrocarbon solvent to extract nickel values from the aqueous ammoniacal leach solution to provide an organic phase now containing nickel values and an aqueous phase from which nickel values have been extracted;

(5) separating the organic phase containing nickel values from the aqueous phase;

(6) contacting the organic phase with an aqueous acid stripping solution to strip nickel values from the organic phase into the aqueous acid stripping solution;

(7) separating the aqueous acid stripping solution from the organic phase; and (8) electrowinning the nickel values from the aqueous acid stripping solution.

In the course of the process, other metals which may raise problems in the solvent extraction process are removed prior to the releaching of the nickel by the ammoniacal leach solution; Such typical problem metals include:

(a) Manganese which under some conditions can form amine complexes and be potentially co-extracted with the nickel;

(b) Magnesium, which is present in laterite ores in significant quantities;

(c) Iron, which may be precipitated as iron oxides in some leach processes extracted by D2EHPA;

(d) Rare earths, which are multivalent and extractable by reagents such as D2EHPA and tributylphosphate (TBP);

(e) Chromium;

(f) Copper/zinc, which are extractable by several reagents including D2EHPA and VERSATIC acids, but not usually present in laterite ores in economically attractive quantities.

Figure 2:
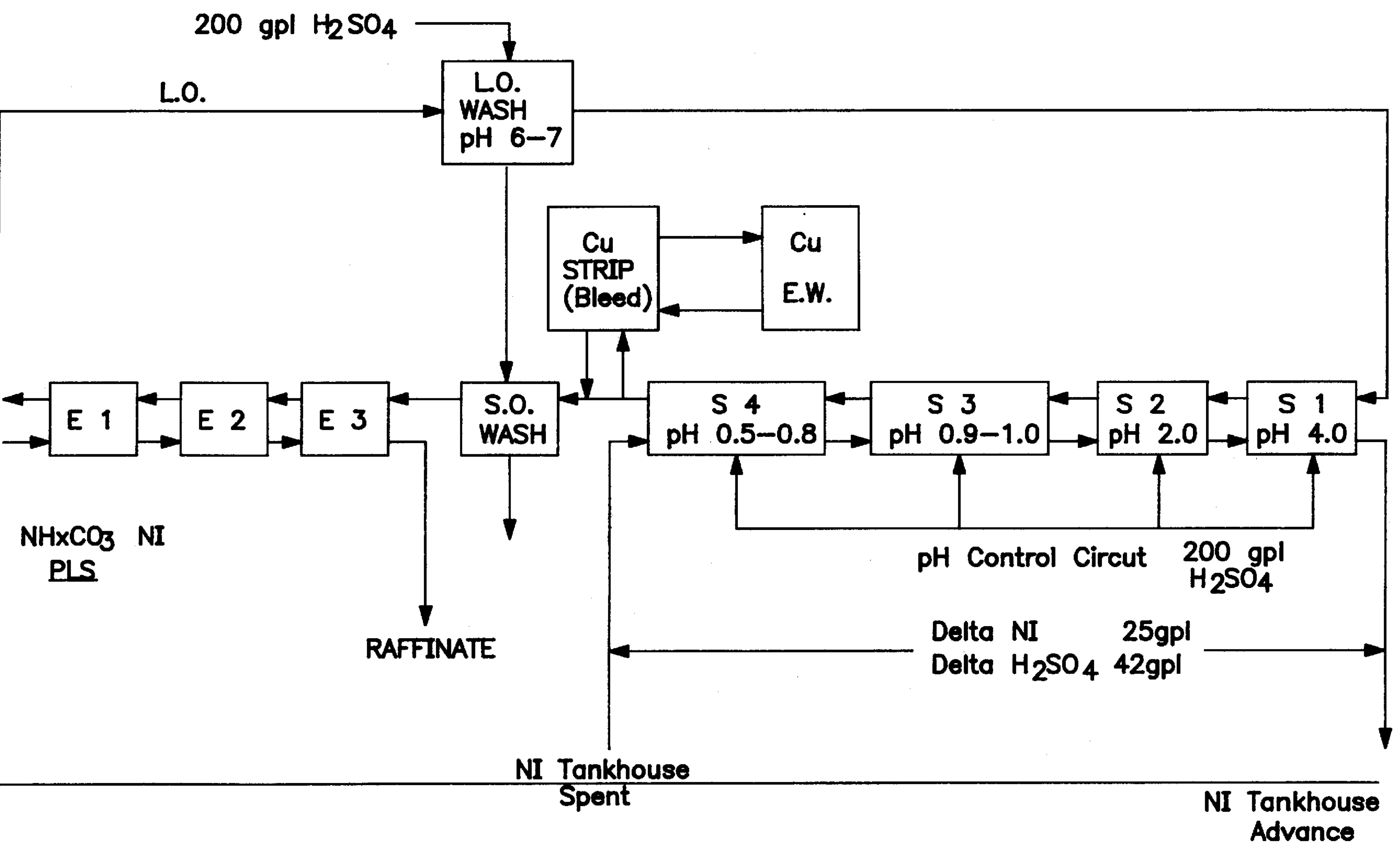
FIG. 2 is a diagrammatic representation of the concluding extraction stage of the aqueous ammoniacal solution containing the nickel, utilizing three extraction stages and 4 strip stages.

The overall process and the extraction from aqueous ammoniacal leach solutions can be seen by reference to FIGS. 1 and 2. As can be seen from FIG. 1, the laterite ore is first leached with an acid leach and the solids separated from the liquid leach solution, shown as L/L Sep. 1.

The next step is the hydroxide precipitation at a pH of 6.0 preferably using MgO and CaO. A second solid (S)/liquid(L) separation takes place here designated as S/L Sep 2 (filter) in which the Fe, Cu, and Zn are removed, as shown in the Figure;

Another hydroxide precipitation is then undertaken at a pH of 9.0 using MgO followed by another S/L separation designated as S/L Sep 3 (Filter) in which Mg (2) plus others are removed;

The nickel is then leached by an aqueous ammoniacal carbonate or sulfate leach solution at ambient pressure shown as NH3/CO2 with air or oxygen also employed;

The aqueous ammoniacal leaching is followed by another S/L Sep 4 (Filter) to remove Mn, as shown;

A further oxidation may be conducted using an air sparge to oxidize any residual Mn which is then precipitated by the use of a phosphate, and the Mn phosphate is then removed by a final S/L separation designated as S/L Sep 5;

The aqueous ammoniacal leach solution now containing the nickel and some residual cobalt is then contacted with the oxime extractant dissolved in a water immiscible hydrocarbon solvent as discussed above to extract the nickel values, with the stripped nickel value containing aqueous solution proceeding to the electrowinning step and the raffinate containing cobalt proceeding to Cobalt recovery by treatment with hydrogen sulfide to precipitate the cobalt or other conventional Co recovery process.

The aqueous ammoniacal extraction can best be seen from FIG. 2, which is shown using three extraction mixer-settler stages E1 through E3 and four mixer-settler stripping stages with pH control shown as S1 through S4. As can be seen, the flow is countercurrent in the process. Thus, in the typical three stage extraction system, the feedstock will flow through an initial mixer-settler stage (E1), subsequently through a second stage (E2) and then through a final mixer-settler stage (E3). The organic phase will in turn initially contact the feedstock in E3, encounter a second contact in E2 and then through a final contact in E1.

After extraction the depleted aqueous feedstock (raffinate is either discharged or recirculated for further leaching. The loaded organic (LO) phase containing the dissolved nickel extractant complex may be washed at a pH of 6–7 to prevent transfer of ammonia to the stripping stages and then fed to another set of mixer-settlers where it is mixed with an aqueous strip solution containing sulfuric acid. The highly acidic strip solution breaks apart the extractant complex and permits the purified and concentrated nickel complex to pass to the strip aqueous phase. As in the extraction process described above, the mixture is fed to another mixer-settler tank for phase separation. The process of breaking the nickel extractant complex is called the stripping stage and the stripping operation is repeated through several stages (in FIG. 2 four stripping stages (S1 through S4) to more completely strip the nickel from the organic phase. Where there is sufficient copper present, a copper strip or "bleed" stream may be employed as shown in FIG. 2 in which the copper may also be recovered in a separate electrowinning step, as shown in the Figure. As with the extraction stages, there is a countercurrent flow in the strip stages, as shown in the Figure. From the stripping settler tank, the regenerated stripped organic (SO) is re-cycled to the extraction mixers optionally after washing of the SO. The stripped aqueous phase containing the nickel is fed to an electrowinning tankhouse, where the nickel metal values are deposited on plates by an electrodeposition process (electrowinning), as shown, The spent electrolyte is returned as shown to the stripping stages i.e. S4, to begin stripping again.

For the ammoniacal leach solution, the feed solution for the extraction preferably contains less than 100 g/l $NH_3$, more desirably less than 70 g/l and most preferably is less than about 40 g/l.

The reagents for use in the practice of the process for the extraction of nickel step include those containing one or more hydroxyaryl oxime extractants of the hydroxy aryl aldoxime or hydroxy aryl ketone oxime type. A general formula for such oximes is formula (I) below;

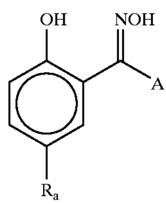

In which A may be:

(I)

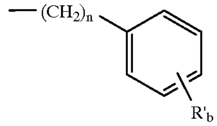

where R and R' may be individually alike or different and are saturated aliphatic groups of 1–25 carbon atoms, ethylenically unsaturated aliphatic groups of 3–25 carbon atoms or OR" where R" is a saturated or ethylenically unsaturated aliphatic group as defined; n is 0 or 1; a and b are each o, 1, 2, 3, 4, with the proviso that both are not 0 and the total number of carbon atoms in $R_a$ and $R'_b$ is from 3 to 25, R'" is a saturated aliphatic group of 1–25 carbon atoms or an ethylenically unsaturated aliphatic group of 3 to 25 carbon atoms, with the proviso that the total number of carbon atoms in $R_a$ and R'" is from 3–25. Preferred compounds where A is (i) above are those in which a is 1, b is 0 R is a straight or branched chain alkyl group having from 7 to 12 carbon atoms and where R is attached in a position para to the hydroxyl group. Among those, the more preferred compounds are those wherein R'" is methyl and R and a are as designated. Compounds wherein n has a value of 0 (i.e. hydroxybenzophenone oxime compounds) may suitably be prepared according to methods disclosed in Swanson U.S. Pat. Nos. 3,952,775 and 3,428,449. By reason of ready solubility in organic diluents commonly employed in solvent extraction and desirable properties of complexes of the compounds with nickel preferred benzophenone compounds are those having a single alkyl group of 7–12 carbon atoms in a position para to the hydroxyl group, in which the alkyl group is a mixture of isomers. Examples of such compounds are 2-hydroxy-5-nonyl-benzophenone oxime and 2-hydroxy-5-dodecyl benzophenone oxime, which are obtained as mixtures of the isomeric forms when commercial nonylphenol and dodecylphenol are respectively employed in their synthesis.

Compounds wherein n has a value of 1 (i.e. hydroxy phenyl benzyl ketone oxime compounds) may suitably be prepared according to methods described in Anderson U.S. Pat. No. 4,029,704. Preferred phenyl benzyl ketone oximes like the above noted benzophenone oximes are those having an isomeric mixture of 7 to 12 carbon alkyl groups as a single substituent on the ring para to the hydroxyl group. These preferred compounds are exemplified by the compound, 2-hydroxy-5-nonylphenyl benzyl ketone oxime, as manufactured from a commercial nonylphenol comprising a mixture of nonyl isomeric forms.

Compounds of the hydroxy phenyl alkyl ketone oxime type may suitably be prepared according to the procedures disclosed in UK Patent 1,322,532. As noted with regard to the benzophenone and phenyl benzyl ketone compounds noted above, the preferred compounds of this type are also those having an isomeric mixture of 7 to 12 carbon alkyl groups as a single substituent on the ring para to the hydroxyl group. Also preferred are those in which the R'" alkyl group is methyl. Illustrative of such preferred compounds where A is $C_6H_5,CH_3$ is 2-hydroxy-5-nonyl phenyl methyl ketone oxime manufactured through the use of commercial nonylphenol.

Hydroxy aryl aldoxime extractants which are employed are those in which A is H. These hydroxy benzaldoximes, also called "salicylaldoximes"), may suitably be prepared according to methods described in Ackerley et al U.S. Pat. No. 4,020,105 or 4,020,106 or by oximation of aldehydes prepared according to Beswick U.S. Pat. No. 4,085,146. Again preferred compounds are those having an isomeric mixture of isomeric 7 to 12 carbon alkyl groups as a single substituent para to the hydroxyl group Mixed alkyl isomeric forms of 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime are preferred, the most preferred for the purposes of the present invention where A is H, being the nonyl and dodecyl compounds.

Reagents may include a single extractant chemical as illustrated above or may comprise mixtures of different aldoxime or ketoxime extractants of the type illustrated in U.S. Pat. No. 4,507,268, 4,544,532 AND 4,582,689.

Modifiers of extraction and stripping equilibria, generally described as "equilibrium modifiers" are usually incorporated in reagent formulations to shift equilibria in a manner facilitating stripping and to enhance overall extraction efficiency. A wide variety of modifiers have been proposed for use in formulation of solvent extraction reagents, and the use thereof is not precluded in the present invention, where desirable. Proposed modifiers have included long chain ($C_6$ to $C_{20}$) aliphatic alcohols such as isodecanol, tridecanol, and 2-ethylhexanol; long chain (6–20) alkyl phenols such as nonylphenol; branched chain, (6–30 carbon) esters and various organophosphorous compounds, such as, tributylphosphate. The most frequently employed modifiers include nonylphenol, tridecanol and 2-ethylhexylphosphate.

As indicated earlier, the oxime reagent which is water insoluble, is dissolved in a water-immiscible liquid hydrocarbon solvent and the resulting organic solution is contacted with the nickel containing aqueous phase to extract at least a portion of the nickel values into the organic phase. The phases are then separated and the nickel values are stripped from the loaded organic (LO) phase by use of an aqueous stripping medium. Prior to stripping, it is not unusual to wash the organic phase, particularly where trace metals may be loaded on the organic extractant. One or more wash stages may accordingly be employed depending on any trace metals present, the amount of entrainment and the required purity of the final nickel loaded stripping solution.

In the process of extraction a wide variety of water immiscible liquid hydrocarbon solvents can be used in the copper recovery process to form the organic phase in which the diketone extractant is dissolved. These include aliphatic and aromatic hydrocarbons such as kerosenes, benzene, toluene, xylene and the like. A choice of essentially water-immiscible hydrocarbon solvents or mixtures thereof will depend on factors, including the plant design of the solvent extraction plant, (mixer-settler units, extractors) and the like. The preferred solvents for use in the present invention are the aliphatic or aromatic hydrocarbons having flash points of 130° Fahrenheit and higher, preferably at least 150° and solubilities in water of less than 0.1% by weight. The solvents are essentially chemically inert. Representative commercially available solvents are Chevron™ ion exchange solvent (available from Standard Oil of California) having a flash point of 195° Fahrenheit; Escaid™ 100 and 110 (available from Exxon-Europe) having a flash point of 180° Fahrenheit; Norpar™ 12 (available from Exxon-USA) with a flash point of 160° Fahrenheit; Conoco™ C1214 (available from Conoco) with a flash point of 160° Fahrenheit; and Aromatic 150 (an aromatic kerosene available from Exxon-USA having a flash point of 150° Fahrenheit), and other various kerosenes and petroleum fractions available from other oil companies.

In the process, the volume ratios of organic to aqueous (O:A) phase will vary widely since the contacting of any quantity of the oxime organic solution with the nickel containing aqueous ammoniacal solution will result in the extraction of nickel values into the organic phase. For commercial practicality however, the organic:aqueous phase ratios for extraction are preferably in the range of about 50:1 to 1:50. It is desirable to maintain an effective O:A ratio of about 1:1 in the mixer unit by recycle of one of the streams. In the stripping step, the organic:aqueous stripping medium phase will preferably be in the range of about 1:4 to 20:1. For practical purposes, the extracting and stripping are normally conducted at ambient temperatures and pressure although higher and lower temperatures and pressures are entirely operable. It is preferable to strip at elevated temperatures. While the entire operation can be carried out as a batch operation, most advantageously the process is carried out continuously as shown in FIG. 2, with the various streams or solutions being recycled to the various operations in the process for recovery of the nickel, including the leaching, extraction and the stripping steps.

In the extraction process, the organic solvent solutions may contain the oxime extractant typically in an amount of about 20–30% by weight, generally on a Volume/Volume percentage (V/V %) with respect to the solvent of about 10–40 V/V%, typically about 30–35 V/V%.

The present invention as illustrated in FIGS. 1 and 2 provides many advantages over the methods or processes employed prior hereto. These include:

1. Impurities which can cause problems in solvent extraction, such as manganese, do not report to the solvent extraction circuit as they are either rejected as hydroxides or as unprecipitated sulfates in the solid-liquid (S/L) separations steps.

2. Magnesium is present in the acid leach solution as magnesium sulfate and will be rejected prior to nickel solvent extraction.

3. The base metal hydroxides can be stored and fed at a uniform rate to the ammonia leach solvent extraction circuit much easier than would be the case if a direct laterite leach nickel solvent extraction process was used.

4. The ammonia leaching of the base metal hydroxide acts as a preconcentration stage and the nickel concentration produced by the ammonia leach solution can be in the range of 10–50 g/l.

5. Stockpiling of the base metal hydroxides makes possible the feeding of a constant tonnage of nickel to the solvent extraction circuits. This enables the solvent extraction plant to operate with a constant organic flow rate at a constant nickel loading in g/l. The latter is important as the strip circuit must be run so as to deliver an advance electrolyte of pH 4.0. If the loaded organic flow to the strip circuit were to decrease in volume or in nickel loading, then at a constant nickel electrowinning rate there would be excess acid in the spent electrolyte and consequently the pH of the advance electrolyte would fall with adverse consequences for the electrowinning circuit.

While much of the details of the proposed process as illustrated and exemplified in FIGS. 1 and 2, have already been discussed, testwork has indicated some points not yet discussed, which may be found in the following examples and comments, particularly in relation to the solvent extraction circuit as shown in FIG. 2.

The extractant (LIX™ 84-I) to be employed is 2-hydroxy-5-nonylacetophenone oxime dissolved in a dearomatized hydrocarbon carrier (kerosene) Exxol D-80 (a product of Exxon having a Flash Point of 80° Centigrade). The max loading characteristics of the reagent can be shown by the following, in which characteristics of an earlier employed reagent, LIX 64N,(2-hydroxy-5-nonyl benzophenone oxime in a hydrocarbon solvent) are reported for comparison. As the figures for the benzophenone oxime are those reported in relation to a 10 V/V% solution, a 10 V/V % solution is reported for the acetophenone oxime preferred for use in the present invention. While the present invention is not particularly concerned with copper extraction, other than the bleed stream shown in FIG. 2, the max loading values for copper are also reported for comparison purposes.

| Max Load | Benzophenone oxime | Acetophenone Oxime |
|---|---|---|
| Ni (g/l) | 2.31 | 4.34–4.82 |
| Cu (g/l) | 2.5 | 4.7–5.0 |

The chemistry of extraction and stripping of Nickel from ammoniacal solutions employing the acetophenone oxime can be seen from the following.

The extraction proceeds as follows:

Tetramine:

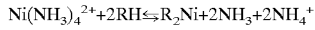

$$Ni(NH_3)_4^{2+} + 2RH \leftrightarrows R_2Ni + 2NH_3 + 2NH_4^+$$

Hexamine:

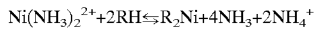

$$Ni(NH_3)_2^{2+} + 2RH \leftrightarrows R_2Ni + 4NH_3 + 2NH_4^+$$

The extraction is an equilibrium reaction and can be driven in either direction depending on the concentrations of the species involved.

During extraction of nickel, ammonia and ammonium is produced. The mass balance shows that the approximate concentrations of these species produced per g/l of nickel extracted are as follows:

| | $NH_3$ (g/l) | $NH_4^+$ (g/l) |
|---|---|---|
| Tetramine Ni | 0.58 | 0.62 |
| Hexamine Ni | 1.16 | 1.62 |

The ammonia and ammonium species report to the raffinate and can be recovered by steam stripping, or lime reboiling, for recycle to leach, a positive aspect of the present extraction process.

If the leach solution undergoing extraction contains significant concentrations of Ni eg. 50 g/l, then extraction of the tetramine will yield about 60 g/l ammonia/ammonium, while extraction of the hexamine will yield about 90 g/l of these species.

Figure 3:
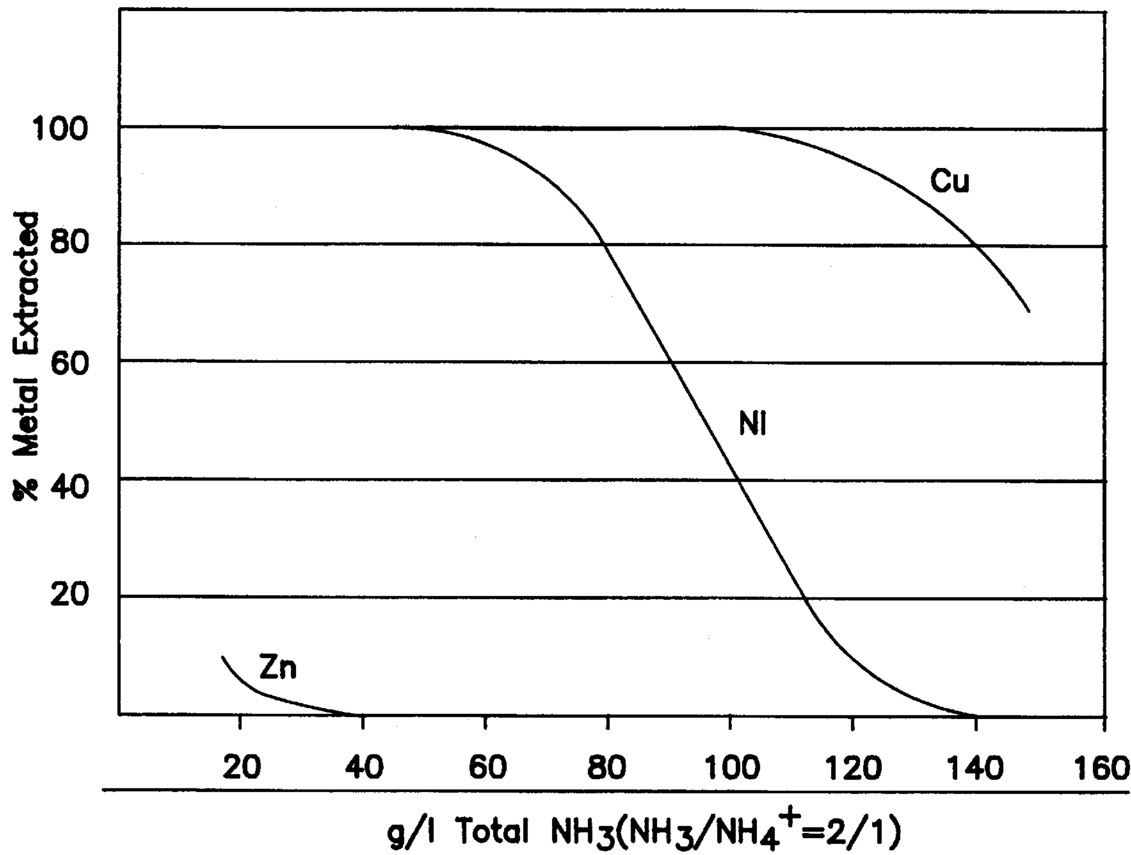
FIG. 3 is a representation of ammonia isotherms for an oxime extractant, LIX™ 84-I, a mixture of 2-hydroxy-5-nonylacetophenone oxime, with a hydrocarbon diluent, for various metals.

The extraction isotherm for the acetophenone is shown in FIG. 3 and shows that at combined ammonia/ammonium concentrations above 60 g/l, the equilibrium is influenced by the ammonia/ammonium concentration in the raffinate.

Following the extraction by the 2-hydroxy-5-acetophenone oxime, the loaded organic can then be stripped by:

1. High (approximately 250–280 g/l $NH_3$ solutions;

or 2. sulfuric acid plus nickel sulfate solutions.

The ammonia strip follows the extraction equilibrium relationship given above, while the acid strip proceeds as follows:

$$R_2Ni+2H^{+}+SO_4^{2-}\leftrightarrows Ni^{2+}+2RH+SO_4^{2-}$$

The acid levels required to strip the acetophenone oxime are relatively low and using a multi-stage stripping, makes it possible to produce a strong nickel electrolyte suitable for electrowinning, rendering the strip aspects of the process practical.

From sulfate solutions, the extraction of nickel using the 2-hydroxy-5-nonylacetophenone oxime extractant proceeds very slowly even when using pH values above 4.0 when extraction is thermodynamically favorable. However, extraction of nickel from ammoniacal solutions containing the tetra, penta and hexa-mines in the range of pH of 8 to 9 is relatively fast and 2–5 minutes residence time should be sufficient. Stripping kinetics for nickel using sulfuric acid and sulfate media are slow, which mirrors the slow extraction kinetics from sulfate media. The stripping kinetics of the 2-hydroxy-5-nonylacetophenone oxime are given in the Table below with kinetics for the benzophenone included for comparison.

| | EXTRACTANT | | |
|---|---|---|---|
| Time (min) | Benzophenone 12 V/V % % stripped | | Acetophenone 30 V/V % % stripped |
| 1 | — | — | 38 |
| 2 | 25 | — | — |
| 3 | 34 | 71 | 86 |
| 5 | 60 | 81 | 98 |
| 10 | 87 | 98 | 100 |
| Loaded Organic (g/l Ni) | 2.27 | 2.27 | 14.01 |
| Temperature Deg.Centigrade | 20 | 40 | 50 |

Cobalt Strip

Testwork has indicated that virtually no $Co^{+2}$ is present in the ammonia/ammonium carbonate leach solution produced in the flowsheet of FIG. 1. If $Co^{+2}$ is present then a reductive strip may be used to remove cobalt.

Based on laboratory testwork, the following nickel circuit details are proposed for the solvent extraction circuit shown in FIG. 2 for recovery of nickel from ammoniacal leach solutions produced by leaching of base metal hydroxides precipitates with $NH_3/CO_2$.

| | Extraction | Wash | Strip |
|---|---|---|---|
| No. of Stages Mixer | 3 | 2 (LO and SO) | 4 |
| Residence Time | 2–3 min. | 2–3 min. | 5–7 min. |
| O/A throughput | 1–3 | 10–20 | ±2 |
| O/A Mixer | 1 | 1 | 1 |
| Temperature (Deg. Centigrade) | 40 | 40 | 40–50 |
| Specific Flow | 4.0 $m^2/m^2/hr.$ | 4.0 $m^2/m^2/hr.$ | 4.0 $m^2/m^2/hr.$ |
| Extractant (Acetophenone) | 30% V/V | 30% V/V | 30% V/V |
| pH | 8–10 | ±6 | gradient 0.5–4.0 |
| PLS | | | |
| g/l Ni | 10–30 | | |
| g/l Co | 0.5–3.0 | | |
| g/l Cu | 0.5–1.0 | | |
| Strong Elecrolyte | | | |
| g/l Ni | | | 95–100 |
| g/l Co | | | 1–20 ppm |
| g/l Cu | | | 0.01–0.03 |
| g/l Zn | | | trace |
| Spent Electrolyte | | | |
| g/l Ni | | | 70–80 |
| g/l $H_2SO_4$ | | | 42 g/l for Ni of 25 g/l |

The following features of the circuit should be noted:

O/A Ratio in Extraction

The maximum loading of 30 %V/V acetophenone is 12–13 g/l Ni. The O/A throughput should be selected so as to allow 99% plus recovery of nickel in the circuit. Higher acetophenone concentrations than 30% can lead to organic viscosity problems, although at 40 degrees Centigrade it may be possible to tolerate 35 V/V% acetophenone.

Loaded Organic Wash

This stage is included to remove ammonia from the loaded organic. The scrub aqueous should be controlled to pH 6.0–7.0 using 200 g/l sulfuric acid. The scrub aqueous flow will be only a few percent of the loaded organic flow and the O/A will be around 10–20. Aqueous recycle is used to maintain an O/A of 1:1 in the mixer. The scrub aqueous from this stage can form the scrub aqueous to the stripped organic stage.

Stripped Organic Wash

This is included to remove any entrained acid from the stripped organic. Entrained acid can cause $CO_2$ gassing in the extraction circuit and may lead to phase disengagement problems.

Strip Circuit pH Profile

This must be carefully maintained to ensure a pH 3–4 electrolyte. Thus the acid in the nickel tankhouse spent must balance, or be less than the acid required to strip the nickel. It takes 1.67 gm. of sulfuric acid to strip one gm of nickel from the oxime. The circuit should incorporate sulfuric acid as a pH control agent. A typical pH profile over the four stages of strip in the countercurrent flow from S4 to S1 will be:

| Stage | pH |
|---|---|
| S4 | 0.5–0.8 |
| S3 | 0.9–1.0 |
| S2 | 2.0 |
| S1 | 4.0 |

As noted earlier, the nickel recovery process of the present invention, involves initially acid leaching of a laterite ore, followed by precipitation on nickel hydroxide, and re-leaching of the nickel in ammonia followed by extraction of the nickel employing a water insoluble oxime extractant reagent dissolved in a water immiscible hydrocarbon solvent, preferably an acetophenone oxime such as 2-hydroxy-5-nonylacetophenone oxime or an alkyl salicylaldoxime. The overall recovery process including the solvent extraction with the nonylacetophenone oxime is shown in FIGS. 1 and 2 and discussed in detail above. The present invention permits the use of higher volume concentrations than 30 V/V% acetophenone oxime extractant and overcomes some of the problems typically encountered in the direct solvent extraction of nickel from acid leach solutions using a proven solvent extraction process step of extraction of nickel from ammoniacal leach solutions in the last step of the process of recovery of the nickel.

What is claimed is:

1. A process for the recovery of nickel from a nickel containing ore comprising:

(a) leaching the ore with an acid to provide an aqueous acid leach solution containing nickel values;

(b) adding a hydroxide to the aqueous acid leach solution to precipitate the nickel as nickel hydroxide;

(c) re-leaching of the nickel hydroxide with an aqueous ammoniacal solution to provide an aqueous ammoniacal solution containing nickel values;

(d) contacting the aqueous ammoniacal solution containing the nickel values with a water insoluble oxime extractant, capable of extracting nickel from said aqueous ammoniacal, dissolved in a water-immiscible hydrocarbon solvent so as to provide an organic phase, for a time sufficient to extract the nickel values from said aqueous ammoniacal solution containing the nickel values thereby providing an aqueous phase of the ammoniacal solution from which nickel values have been removed and a water-immiscible organic phase, now containing the extracted nickel values;

(e) separating the aqueous and the organic phases;

(f) contacting the organic phase containing the nickel values with an aqueous acid solution thereby stripping the nickel values from the organic phase into the aqueous acid stripping solution; (g) separating the aqueous acid stripping solution now containing the nickel values from the water-immiscible organic phase; and (h) electrowinning the nickel from the aqueous acid stripping solution to remove and recover the nickel.

2. A process as defined in claim 1, wherein said acid leach solution is a sulfuric acid solution.

3. A process as defined in claim 1, wherein metal values co-extracted in the acid leach solution in step (a), which may interfere with the solvent extraction step (d) are removed prior to the releaching step (c) or in a bleed stream during the solvent extraction and stripping steps (d) and (f) prior to the electrowining step (h).

4. A process as defined in claim 1 wherein the hydroxide precipitation step (b) is carried out in two stages, the first stage being conducted at a pH of about 6 employing MgO and CaO, after which the solids are separated from the liquids, followed by the second stage precipitation carried out at a pH of about 9.0 employing MgO after which the solids are again separated from the liquids.

5. A process as defined in claim 1 wherein the aqueous ammoniacal re-leaching solution in step (c) is an aqueous ammoniacal carbonate solution.

6. A process as defined in claim 1 wherein the aqueous ammoniacal re-leaching solution in step (c) is an aqueous ammoniacal sulfate solution.

7. A process as defined in claim 1 wherein the extraction step (d) is carried out in three extraction stages E1 through E3 in a counter current flow from E3 to E1.

8. A process as defined in claim 1 wherein the stripping step (f) is carried out in 4 strip stages S1 through S4 in a countercurrent flow from S4 to S1.

9. A process as defined in claim 8, wherein said stripping solution is a sulfuric acid solution.

10. A process as defined in claim 8, wherein the four stripping stages are pH controlled in a gradient of from about 0.5 to about 4.0.

11. Process as defined in claim 8 wherein the pH in stripping stage S4 is controlled at a pH of about 0.5–0.8; in S3 at a pH of about 0.9–1.0; in S2 at a pH of about 2.0 and in S1 at a pH of abut 4.0; to provide an electrolyte of a pH of 3–4 prior to electrowinning step (h).

12. A process as defined in claim 1, wherein the water insoluble oxime extractant in step (d) is a hydroxyaryl oxime.

13. A process as defined in claim 10, wherein said oxime is selected from the group consisting of salicylaldoximes and ketoximes.

14. A process as defined in claim 13, wherein the salicylaldoxime is a 5-nonyl, or dodecyl, salicylaldoxime.

15. A process as defined in claim 13, wherein the ketoxime is 2-hydroxy-5-nonylacetophenone oxime.

16. A process as defined in claim 1, wherein said water-immiscible hydrocarbon solvent is selected from the group consisting of kerosene, benzene, toluene, and xylene.

17. A process as defined in claim 1 wherein the oxime extractant is 5-nonylacetophenone oxime and said hydrocarbon solvent in which the acetophenone oxime is dissolved to form an organic phase is a kerosene.

18. A process as defined in claim 17, wherein acetophenone oxime is present in the kerosene solvent in about 10 to about 35 V/V%.

19. A process as defined in claim 1, and further comprising the step of recovering Co from the aqueous phase raffinate of step (e).

* * * * *